United States Patent
Kim et al.

(10) Patent No.: US 7,372,511 B2
(45) Date of Patent: May 13, 2008

(54) DEVICE FOR CONTROLLING SPREADING OF LIQUID CRYSTAL AND METHOD FOR FABRICATING AN LCD

(75) Inventors: Wan Soo Kim, Kyonggi-do (KR); Hyug Jin Kweon, Kyongsangbuk-do (KR); Hae Joon Son, Pusan-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/329,413

(22) Filed: Dec. 27, 2002

(65) Prior Publication Data

US 2003/0169378 A1 Sep. 11, 2003

(30) Foreign Application Priority Data

Mar. 8, 2002 (KR) ................. 2002-12489
Mar. 13, 2002 (KR) ................. 2002-13565

(51) Int. Cl.
*G02F 1/133* (2006.01)
*G02F 1/1341* (2006.01)

(52) U.S. Cl. .................. 349/20; 349/21; 349/189

(58) Field of Classification Search ........... 349/187, 349/123, 124, 126, 20, 21, 189, 190
See application file for complete search history.

(56) References Cited

U.S. PATENT DOCUMENTS

| | | | |
|---|---|---|---|
| 3,978,580 A | | 9/1976 | Leupp et al. |
| 4,094,058 A | | 6/1978 | Yasutake et al. |
| 4,150,878 A | * | 4/1979 | Barzilai et al. ........... 349/156 |
| 4,653,864 A | | 3/1987 | Baron et al. |
| 4,691,995 A | * | 9/1987 | Yamazaki et al. ........ 349/189 |
| 4,775,225 A | | 10/1988 | Tsuboyama et al. |
| 5,108,332 A | * | 4/1992 | Brosgi ....................... 445/24 |
| 5,247,377 A | | 9/1993 | Omeis et al. |
| 5,263,888 A | | 11/1993 | Ishihara et al. |
| 5,379,139 A | | 1/1995 | Sato et al. |
| 5,406,989 A | | 4/1995 | Abe |
| 5,499,128 A | | 3/1996 | Hasegawa et al. |
| 5,507,323 A | * | 4/1996 | Abe ........................... 141/31 |
| 5,511,591 A | | 4/1996 | Abe |
| 5,523,128 A | * | 6/1996 | Itoh et al. ................. 428/1.26 |
| 5,539,545 A | | 7/1996 | Shimizu et al. |
| 5,548,429 A | | 8/1996 | Tsujita |
| 5,629,056 A | * | 5/1997 | Koike et al. ............. 428/1.26 |
| 5,642,214 A | | 6/1997 | Ishii et al. |
| 5,680,189 A | | 10/1997 | Shimizu et al. |
| 5,742,370 A | | 4/1998 | Kim et al. |
| 5,757,451 A | | 5/1998 | Miyazaki et al. |

(Continued)

FOREIGN PATENT DOCUMENTS

EP    1 003 066 A1    5/2000

(Continued)

*Primary Examiner*—Mike Qi
(74) *Attorney, Agent, or Firm*—McKenna Long & Aldridge, LLP

(57) ABSTRACT

Device for controlling spreading of liquid crystal including a stage, and variable temperature controlling means in the stage for controlling spreading of the liquid crystal, wherein the variable temperature controlling means is formed of a heating wire, and controls a temperature within a varied temperature of approximately 30°-120°, thereby reducing gaps of liquid crystal drops.

16 Claims, 7 Drawing Sheets

U.S. PATENT DOCUMENTS

| | | | |
|---|---|---|---|
| 5,796,458 A * | 8/1998 | Koike et al. | 349/126 |
| 5,828,435 A * | 10/1998 | Kato et al. | 349/190 |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,898,041 A * | 4/1999 | Yamada et al. | 522/81 |
| 5,952,676 A | 9/1999 | Sato et al. | |
| 5,952,678 A | 9/1999 | Ashida | |
| 5,956,112 A | 9/1999 | Fujimori et al. | |
| 6,001,203 A | 12/1999 | Yamada et al. | |
| 6,011,609 A * | 1/2000 | Kato et al. | 349/190 |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,219,126 B1 | 4/2001 | Von Gutfeld | |
| 6,222,603 B1 | 4/2001 | Sakai et al. | |
| 6,226,067 B1 | 5/2001 | Nishiguchi et al. | |
| 6,236,445 B1 | 5/2001 | Foschaar et al. | |
| 6,271,278 B1 * | 8/2001 | Park et al. | 521/150 |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 6,468,599 B1 * | 10/2002 | Terada | 427/558 |
| 2001/0002100 A1 | 5/2001 | Compton et al. | |
| 2002/0061361 A1 * | 5/2002 | Nakahara | 427/58 |
| 2002/0196393 A1 * | 12/2002 | Tashiro et al. | 349/106 |
| 2004/0119924 A1 * | 6/2004 | Takeda et al. | 349/129 |

FOREIGN PATENT DOCUMENTS

| | | |
|---|---|---|
| EP | 1003066 | 5/2000 |
| JP | 51065656 | 6/1976 |
| JP | 57038414 | 3/1982 |
| JP | 57088428 | 6/1982 |
| JP | 58027126 | 2/1983 |
| JP | 59057221 | 4/1984 |
| JP | 59195222 | 11/1984 |
| JP | 60111221 | 6/1985 |
| JP | 60164723 | 8/1985 |
| JP | 60217343 | 10/1985 |
| JP | 61007822 | 1/1986 |
| JP | 61055625 | 3/1986 |
| JP | 62-054225 | 3/1987 |
| JP | 62-054228 | 3/1987 |
| JP | 62-054229 | 3/1987 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | 03-009549 | 1/1991 |
| JP | 05-036425 | 2/1993 |
| JP | 05-036426 | 2/1993 |
| JP | 05-107533 | 4/1993 |
| JP | 05127179 | 5/1993 |
| JP | 5154923 | 6/1993 |
| JP | 05265011 | 10/1993 |
| JP | 05281557 | 10/1993 |
| JP | 05281562 | 10/1993 |
| JP | 06-018829 | 1/1994 |
| JP | 06051256 | 2/1994 |
| JP | 06-064229 | 3/1994 |
| JP | 06148657 | 5/1994 |
| JP | 6160871 | 6/1994 |
| JP | 06-194637 | 7/1994 |
| JP | 6235925 | 8/1994 |
| JP | 06265915 | 9/1994 |
| JP | 6313870 | 11/1994 |
| JP | 06-342137 | 12/1994 |
| JP | 7084268 | 3/1995 |
| JP | 07128674 | 5/1995 |
| JP | 07181507 | 7/1995 |
| JP | 07-275770 | 10/1995 |
| JP | 07-275771 | 10/1995 |
| JP | 08-076133 | 3/1996 |
| JP | 08-110504 | 4/1996 |
| JP | 08095066 | 4/1996 |
| JP | 8101395 | 4/1996 |
| JP | 08106101 | 4/1996 |
| JP | 08-136937 | 5/1996 |
| JP | 08-173874 | 7/1996 |
| JP | 08171094 | 7/1996 |
| JP | 08190099 | 7/1996 |
| JP | 08240807 | 9/1996 |
| JP | 09-001026 | 1/1997 |
| JP | 09005762 | 1/1997 |
| JP | 09026578 | 1/1997 |
| JP | 9061829 | 3/1997 |
| JP | 09073075 | 3/1997 |
| JP | 09073096 | 3/1997 |
| JP | 09-094500 | 4/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10-174924 | 6/1998 |
| JP | 10177178 | 6/1998 |
| JP | 10221700 | 8/1998 |
| JP | 10282512 | 10/1998 |
| JP | 10333157 | 12/1998 |
| JP | 10333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11133438 | 5/1999 |
| JP | 11142864 | 5/1999 |
| JP | 11174477 | 7/1999 |
| JP | 11212045 | 8/1999 |
| JP | 11-262712 | 9/1999 |
| JP | 11-264991 | 9/1999 |
| JP | 11248930 | 9/1999 |
| JP | 11326922 | 11/1999 |
| JP | 11344714 | 12/1999 |
| JP | 2000002879 | 1/2000 |
| JP | 2000029035 | 1/2000 |
| JP | 20000056311 | 2/2000 |
| JP | 2000-066218 | 3/2000 |
| JP | 20000066165 | 3/2000 |
| JP | 2000-093866 | 4/2000 |
| JP | 2000-147258 | 5/2000 |
| JP | 2000137235 | 5/2000 |
| JP | 2000193988 | 7/2000 |
| JP | 2000241824 | 9/2000 |
| JP | 2000284295 | 10/2000 |
| JP | 2000292799 | 10/2000 |
| JP | 2000310759 | 11/2000 |
| JP | 2000310784 | 11/2000 |
| JP | 2000338501 | 12/2000 |
| JP | 2001005401 | 1/2001 |
| JP | 2001005405 | 1/2001 |
| JP | 2001013506 | 1/2001 |
| JP | 2001033793 | 2/2001 |
| JP | 2001042341 | 2/2001 |
| JP | 2001051284 | 2/2001 |
| JP | 2001066615 | 3/2001 |

| | | | | | | |
|---|---|---|---|---|---|---|
| JP | 2001-100213 | 4/2001 | | JP | 2002090760 | 3/2002 |
| JP | 2001091727 | 4/2001 | | JP | 2002-122870 | 4/2002 |
| JP | 2001117105 | 4/2001 | | JP | 2002107740 | 4/2002 |
| JP | 2001117109 | 4/2001 | | JP | 2002122872 | 4/2002 |
| JP | 2001133745 | 5/2001 | | JP | 2002122873 | 4/2002 |
| JP | 2001133794 | 5/2001 | | JP | 2002-131762 | 5/2002 |
| JP | 2001133799 | 5/2001 | | JP | 2002-156518 | 5/2002 |
| JP | 2001142074 | 5/2001 | | JP | 2002-169166 | 6/2002 |
| JP | 2001147437 | 5/2001 | | JP | 2002-169167 | 6/2002 |
| JP | 2001154211 | 6/2001 | | JP | 2002-182222 | 6/2002 |
| JP | 2001166272 | 6/2001 | | JP | 2002080321 | 6/2002 |
| JP | 2001166310 | 6/2001 | | JP | 2002202512 | 7/2002 |
| JP | 2001183683 | 7/2001 | | JP | 2002202514 | 7/2002 |
| JP | 2001-209056 | 8/2001 | | JP | 2002214626 | 7/2002 |
| JP | 2001-209057 | 8/2001 | | JP | 2002-229042 | 8/2002 |
| JP | 2001-209058 | 8/2001 | | JP | 2002-236276 | 8/2002 |
| JP | 2001-222017 | 8/2001 | | JP | 2002-258299 | 8/2002 |
| JP | 2001209052 | 8/2001 | | JP | 2002-236292 | 9/2002 |
| JP | 2001209060 | 8/2001 | | JP | 2002-277865 | 9/2002 |
| JP | 2001222017 | 8/2001 | | JP | 2002-277866 | 9/2002 |
| JP | 2001235758 | 8/2001 | | JP | 2002-277881 | 9/2002 |
| JP | 2001021000 | 9/2001 | | JP | 2002-287156 | 10/2002 |
| JP | 2001255542 | 9/2001 | | JP | 2002-296605 | 10/2002 |
| JP | 2001264782 | 9/2001 | | JP | 2002-311438 | 10/2002 |
| JP | 2001026347 | 10/2001 | | JP | 2002-311440 | 10/2002 |
| JP | 2001026348 | 10/2001 | | JP | 2002-311442 | 10/2002 |
| JP | 2001272640 | 10/2001 | | JP | 2002-314355 | 11/2002 |
| JP | 2001281675 | 10/2001 | | JP | 2002-314356 | 11/2002 |
| JP | 2001282126 | 10/2001 | | JP | 2002-323687 | 11/2002 |
| JP | 2001305563 | 10/2001 | | JP | 2002-323694 | 11/2002 |
| JP | 2001330837 | 11/2001 | | JP | 2002-333628 | 11/2002 |
| JP | 2001330840 | 11/2001 | | JP | 2002-333635 | 11/2002 |
| JP | 2001337335 | 12/2001 | | JP | 2002-333843 | 11/2002 |
| JP | 2001356353 | 12/2001 | | JP | 2002-341329 | 11/2002 |
| JP | 2001356354 | 12/2001 | | JP | 2002-341357 | 11/2002 |
| JP | 2002014360 | 1/2002 | | JP | 2002-341358 | 11/2002 |
| JP | 2002023176 | 1/2002 | | JP | 2002-341359 | 11/2002 |
| JP | 2002049045 | 2/2002 | | JP | 2002-341362 | 11/2002 |
| JP | 2002-079160 | 3/2002 | | KR | 20000035302 | 6/2000 |
| JP | 2002-080321 | 3/2002 | | | | |
| JP | 2002082340 | 3/2002 | | | | |
| JP | 2002090759 | 3/2002 | | | | |

* cited by examiner

DEVICE FOR CONTROLLING SPREADING OF LIQUID CRYSTAL AND METHOD FOR FABRICATING AN LCD

This application claims the benefit of the Korean Application Nos. P2002-12489 filed on Mar. 8, 2002, and P2002-13565 filed on Mar. 13, 2002, which are hereby incorporated by reference for all purposes as if fully set forth herein.

This application incorporates by reference two co-pending applications, Ser. No 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal display (LCD), and more particularly, to a device for controlling spreading of liquid crystal, which can maximize spreading of the liquid crystal in dropping the liquid crystal, and a method for fabricating an LCD.

2. Background of the Related Art

Keeping pace with development of an information oriented society, demands on displays increase gradually in a variety of forms, and, recently to meet the demands, different flat display panels, such as Liquid Crystal Display (LCD), Plasma Display Panel (PDP), Electro Luminescent Display (ELD), Vacuum Fluorescent Display (VFD), and the like, have been under development, and some of which are employed as displays in various apparatuses.

Of the different flat displays, the LCDs have been used most widely as mobile displays while the LCDs replaces the Cathode Ray Tube (CRT) owing to features and advantages of excellent picture quality, light weight, thin size, and low power consumption. Besides the mobile type LCDs, such as notebook computer monitors, the LCDs are under development for televisions (TVs) for receiving and displaying broadcasting signals, and computer monitors.

The LCD is provided with two opposite substrates, and liquid crystal injected between the two opposite substrates for varying a phase with temperature or density.

The liquid crystal is a substance having intermediate properties of liquid and solid, with a liquidity of a liquid and a long range order property of a solid. That is, the liquid crystal is a substance of an intermediate state of crystalline solid and liquid before a crystalline solid is melted into liquid. Upon directing light, or applying electricity, or magnetic field to the liquid crystal, a birefringence peculiar to an optical anisotropic crystal is shown, and within a certain temperature range, properties both of the liquid and the crystalline solid are shown.

The foregoing LCD is fabricated by progressing an array process, a cell process, and a module process on a glass substrate.

In the array process, wiring patterns, or switching devices (in a case of an active matrix type), such as thin film transistors (TFT), are fabricated. In the cell process, orientation processing, spacer disposal, or liquid crystal injection into the opposite glass substrates and sealing, are made. In the module process, a driver integrated circuit (IC), and a back light are fitted.

A liquid crystal injection process in the cell process will be briefly explained.

At first, a large sized panel is provided, which is formed by bonding and setting a first substrate inclusive of a plurality of TFT unit substrate regions, and a second substrate inclusive of a plurality of color filter unit substrate regions, by means of sealant.

The TFT unit substrate regions are provided with a plurality of gatelines running in one direction at fixed intervals, a plurality of datalines running in one direction perpendicular to the gatelines at fixed intervals, and a plurality of thin film transistors and pixel electrodes formed at a matrix of pixel regions defined by the gatelines and the datalines, which are formed in array process, respectively.

The color filter unit substrate regions are provided with a black matrix layer for shielding light from parts excluding the pixel region, the color filter layer, the common electrode, and the like.

The large sized panel is cut into a plurality of LCD unit panels. Then, liquid crystal and the plurality of LCD unit panels are placed in a vacuum chamber, and an injection hole formed by sealant is dipped in the liquid crystal. Then, by restoring the vacuum chamber to atmospheric pressure, the liquid crystal is injected between the LCD unit panel. This liquid crystal injection method is referred to as a vacuum injection method, which will be explained in more detail.

Referring to FIG. 1, liquid crystal is filled into a container 30, and placed in a chamber 20. Then, a deaeration process is carried out, in which the chamber 20 is maintained at a vacuum to remove moisture from an inside of the liquid crystal, or attached to an inside wall chamber, and fine air bubbles in the liquid crystal.

Next, after the liquid crystal injection holes of the LCD unit panels 40 are dipped, or brought into contact with the liquid crystal, nitrogen gas $N_2$ is introduced into the chamber 20 to boost a pressure of the chamber from a vacuum to atmospheric pressure. Then, the liquid crystal is injected into the LCD unit panels through the injection holes by a pressure difference between a pressure inside of the LCD unit panels 40 and a pressure in the chamber.

When the liquid crystal 25 is filled in the LCD unit panels 40 fully, the LCD unit panels 40 are cleaned after the injection holes are sealed.

The foregoing liquid crystal injection method has a poor productivity because of the long time period required for the liquid crystal injection caused by cutting into LCD unit panels, maintaining a space between the two substrate at a vacuum, dipping the LCD unit substrates into the liquid crystal, or bringing the LCD unit substrates into contact with the liquid crystal. Moreover, when a large sized LCD is fabricated, since liquid crystal may not be injected into the LCD unit panel perfectly, this causes a defective LCD.

Eventually, for coping with the foregoing problem, the following liquid crystal dropping method has been recently suggested. A method for fabricating an LCD having the liquid crystal dropping method applied thereto will be explained, with reference to FIG. 2.

Referring to FIG. 2, orientation material is coated on a first substrate having TFT unit substrate regions, and a second substrate having color filter unit substrate regions. Then, an orientation process is conducted such that liquid crystal molecules have an orientation (1S), and the first, and the second substrates are cleaned (2S).

The cleaned second substrate is loaded on a seal dispenser, and sealant is coated to a periphery of each of the panel regions (3S). As the sealant, photo, or thermo setting resin is employed, and no liquid crystal injection hole is required.

On the other hand, the first substrate is loaded on a liquid crystal (LC) dispenser, and the liquid crystal is dropped on active array regions of respective panels (6S). In this instance, the cleaned first or second substrate may be loaded on a silver (Ag) dispenser, to form Ag dots on the common voltage supply line on the first substrate, or formation of the Ag dots may be omitted as in an In Plane Switching (IPS) mode.

The liquid crystal dropping method will be briefly explained.

Referring to FIG. 3, a first substrate 60 is loaded on a table 70 of a liquid crystal dispenser 50. There is a syringe 80 full of liquid crystal over the first substrate 60, for dropping liquid crystal thereon.

In general, the liquid crystal 65 is dropped in a form of a drop on the substrate 60. The substrate 60 moves at a fixed speed and direction, and the syringe 80 discharges the liquid crystal 65 matched thereto, thereby setting a liquid crystal dropping location.

Though not shown in the drawings, the syringe 80 has an external gas line connected thereto, for supplying nitrogen gas $N_2$ from an external gas source, to apply a pressure to the liquid crystal, and drop the liquid crystal.

Next, referring to FIG. 2, the first and second substrates are loaded on a vacuum bonding chamber, and bonded such that the dropped liquid crystal is filled in the panel uniformly, and the sealant is set (7S), to complete fabrication of the large sized panel.

Then, an Scribe/Break (S/B) process (9S) is conducted, inclusive of a scribing process in which cutting lines are formed in a surface of glass by using a diamond pen, which has a hardness higher than glass, and a breaking process in which a force is applied to the glass, to break the glass, thereby cutting the large sized panel into of a plurality of LCD unit panels of unit cells.

Then, after subjecting surfaces of the LCD unit panel to grinding (10S), the LCD unit panels are subjected to Auto/Probe (A/P) inspection (11S), to finish a liquid crystal cell process.

In the A/P inspection, a device having a voltage terminal for applying a voltage is employed for examining electric defects of the LCD unit panel. That is, the voltage terminal is electrically connected to the gateline and dataline on the TFT substrate in the LCD unit panel, for examining cell gap defects or defective liquid crystal injection (imperfect injection, or leak) in the unit panel.

Though not shown in the drawing, upon finishing a liquid crystal cell fabrication process through the foregoing series of fabrication processes, a module fabrication process is performed, in which a driver IC, or back light is fitted.

However, the related art method for fabricating an LCD having the liquid crystal dropping method applied thereto has the following problems.

In the bonding process, the first and second substrates are aligned opposite to each other, and the environment is evacuated until the liquid crystal is spread on the surface of the substrate, and reaches to a section of the sealant in a periphery, thereby the two substrates are bonded.

In detail, referring to FIG. 4, liquid crystal is dropped on the first substrate 60 in forms of drops at fixed intervals. Distances between adjacent liquid crystal drops 65 have relations of $d2=d4=d6=d8>d1=d3=d5=d7$.

Next, referring to FIG. 5, the dropped liquid crystal 65 is spread slowly on the surface of the substrate in a circular form 65A during bonding the first and the second substrates together. Gaps 67, in which the liquid crystal is not yet filled, are formed before the liquid crystal is spread completely.

Therefore, the environment is evacuated until the gaps 67 become adequately small, in the bonding of the first and second substrates.

However, it takes about 20 minutes until the gaps 67 become adequately small, enough to finish the liquid crystal spreading. There has been a hazard of peeling off of the sealant, and subsequent leakage of the liquid crystal, caused by a pressure difference between inside and outside of the substrates during such a waiting time period.

Though not shown, blots may occur at boundaries of the dropped liquid crystal, which deteriorates a picture quality.

SUMMARY OF THE INVENTION

Accordingly, the present invention is directed to a device for controlling spreading of liquid crystal, and a method for fabricating an LCD that substantially obviates one or more of the problems due to limitations and disadvantages of the related art.

An advantage of the present invention is to provide a device for controlling spreading of liquid crystal, and a method for fabricating an LCD, in which gaps of liquid crystal can be reduced, effectively.

Another advantage of the present invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for controlling spreading of liquid crystal includes a stage, and variable temperature controlling means in the stage for controlling spreading of the liquid crystal, wherein the variable temperature controlling means is formed of a heating wire, and controls a temperature within a varied temperature of about 30° C.-120° C.

In another aspect of the present invention, there is provided a method for fabricating an LCD, including (a) providing a substrate, (b) loading the substrate on a stage having a surface a temperature thereof can be varied, and (c) dropping liquid crystal at fixed pitches on the substrate.

In further aspect of the present invention, there is provided a method for fabricating an LCD, including (a) providing a substrate, (b) forming an orientation film of a high wettability on the substrate, and (c) dropping liquid crystal at fixed pitches on the orientation film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
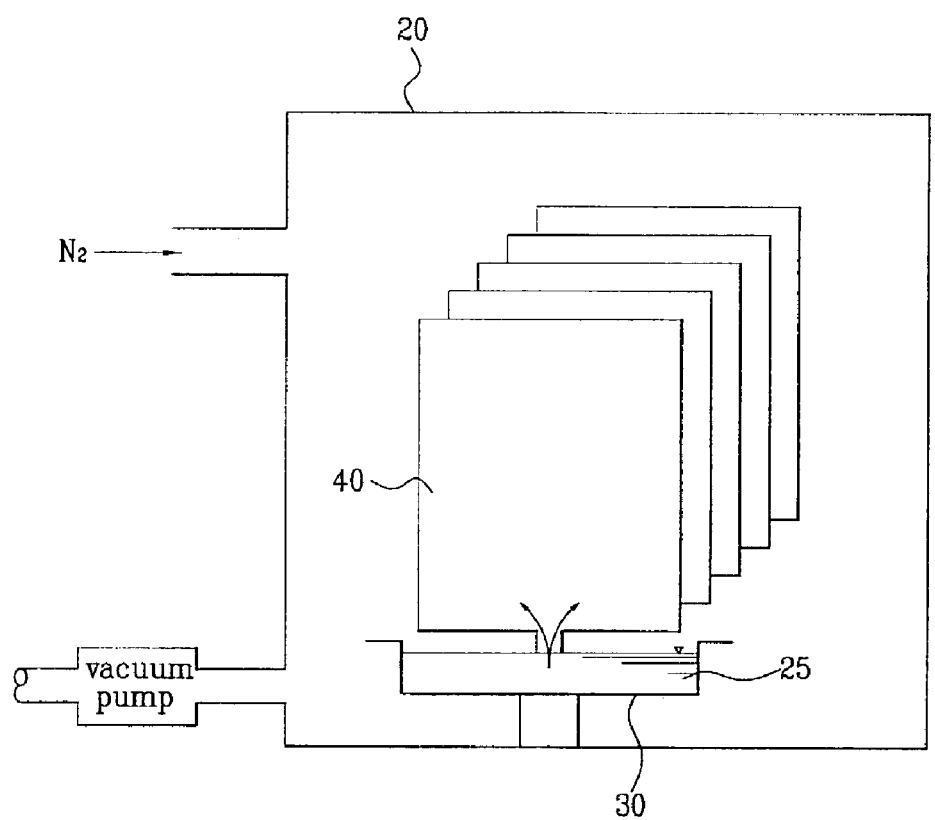
FIG. 1 illustrates a perspective view for explaining a related art vacuum injection method.
Figure 2:
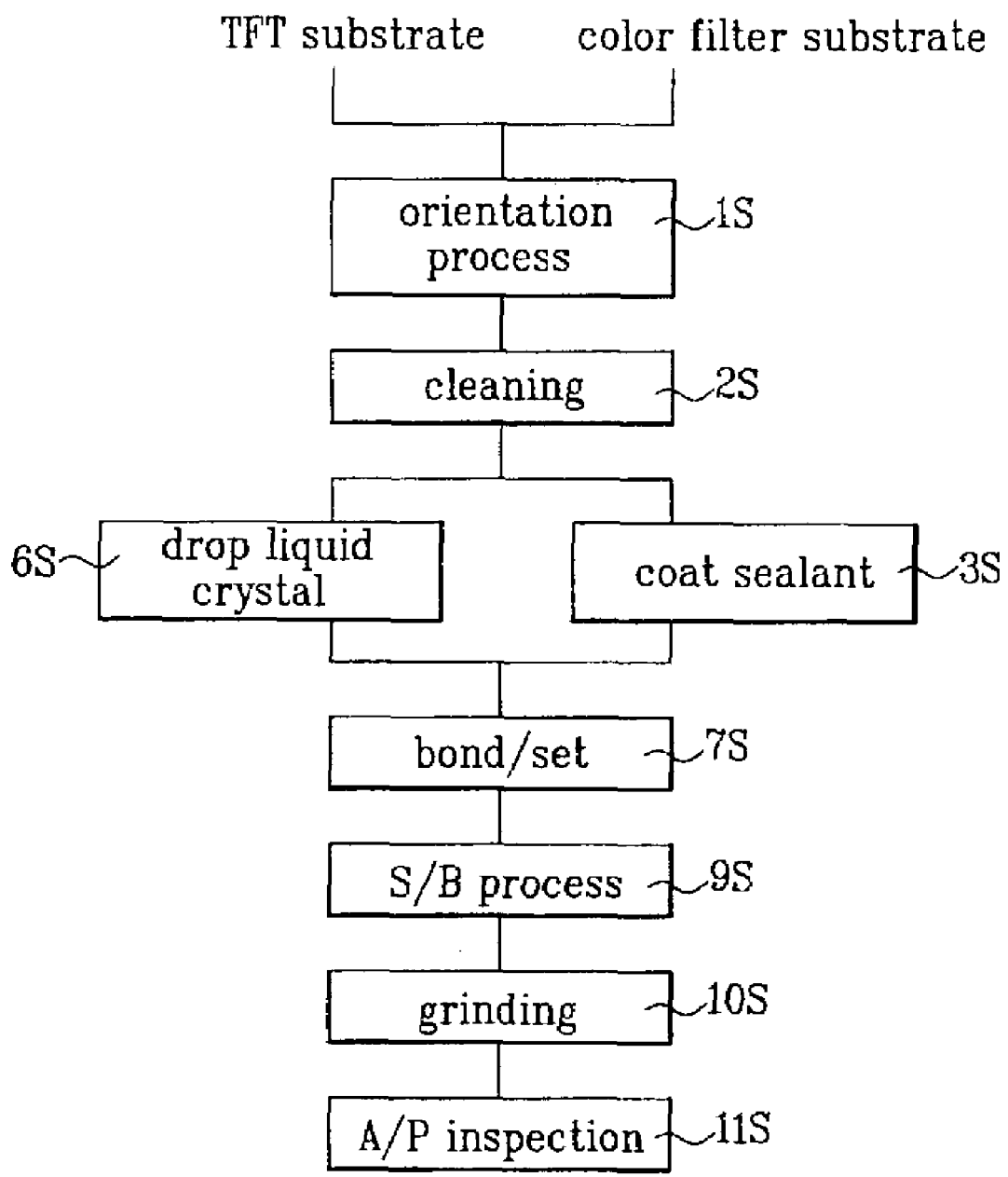
FIG. 2 illustrates a flow chart for explaining a related art dropping injection method.
Figure 3:
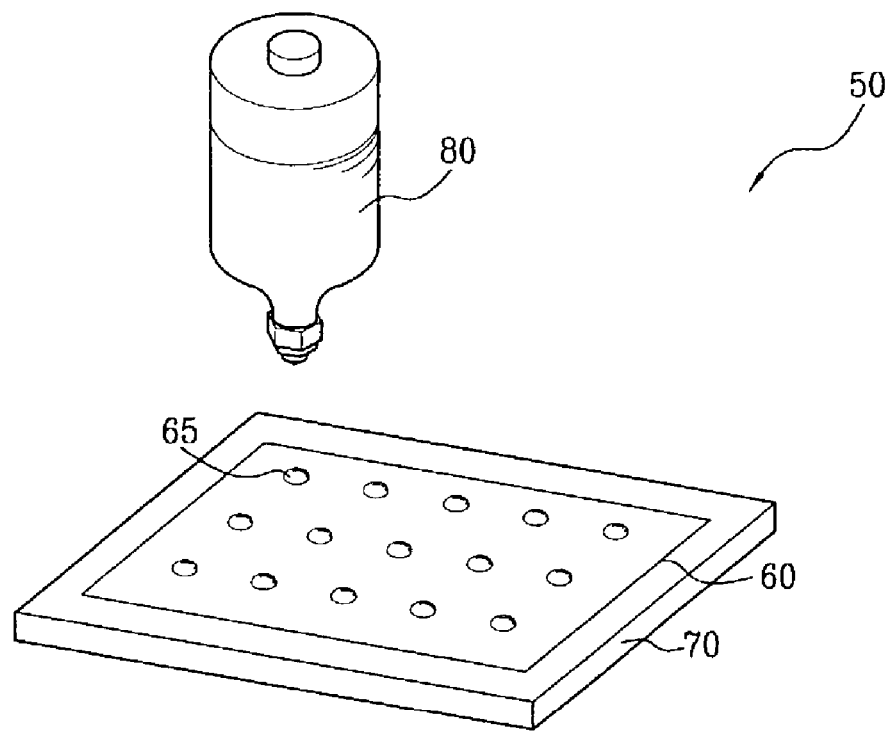
FIG. 3 illustrates a perspective view for explaining a related art liquid crystal dropping method.
Figure 4:
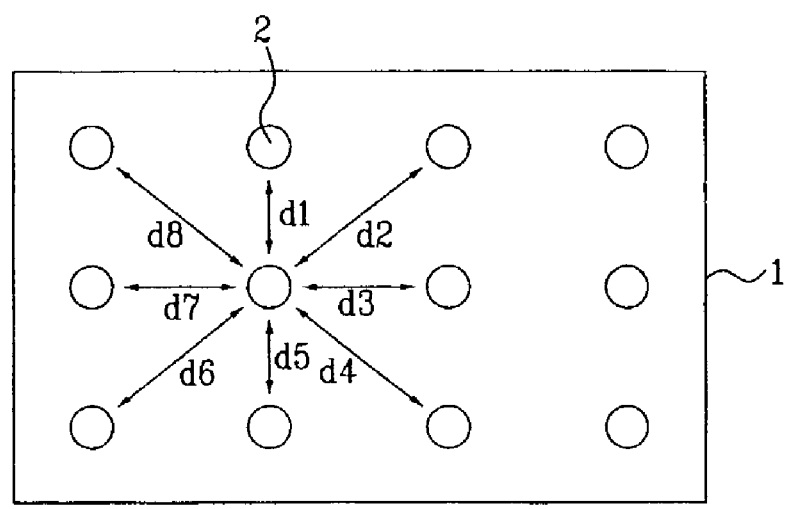
FIG. 4 illustrates a state after dropping liquid crystal in the related art.
Figure 5:
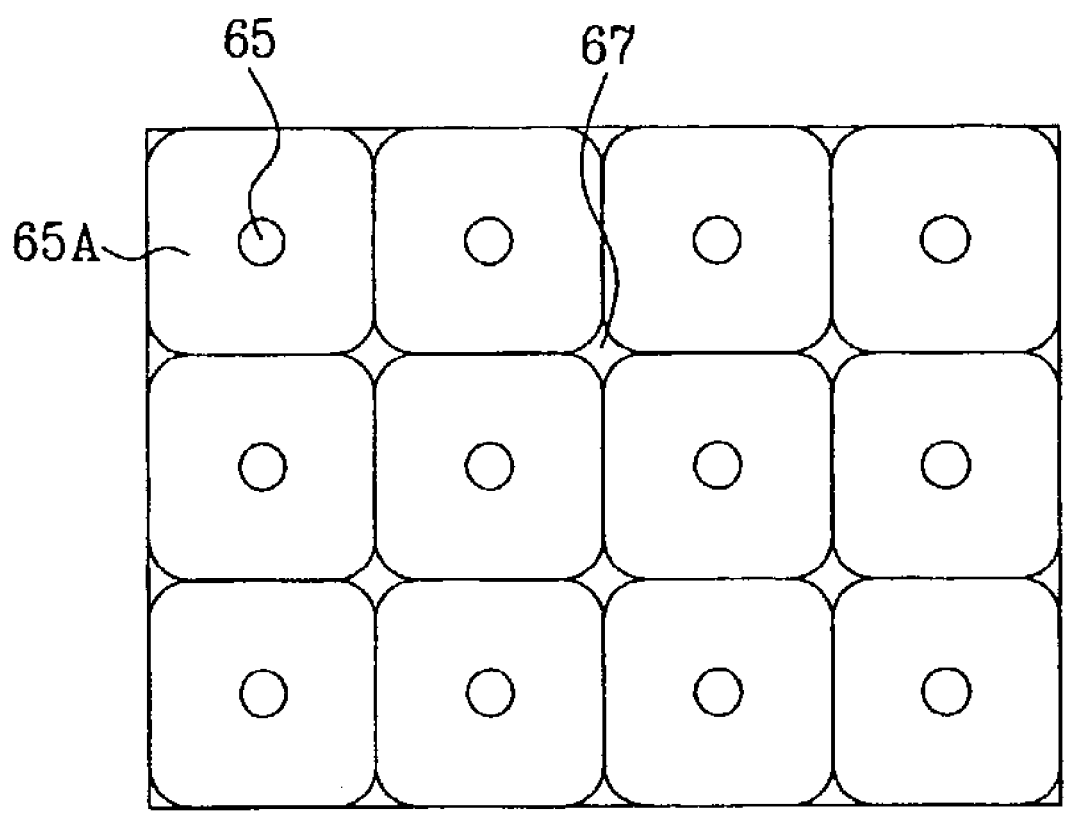
FIG. 5 illustrates a state after a bonding process in the related art.
Figure 6:
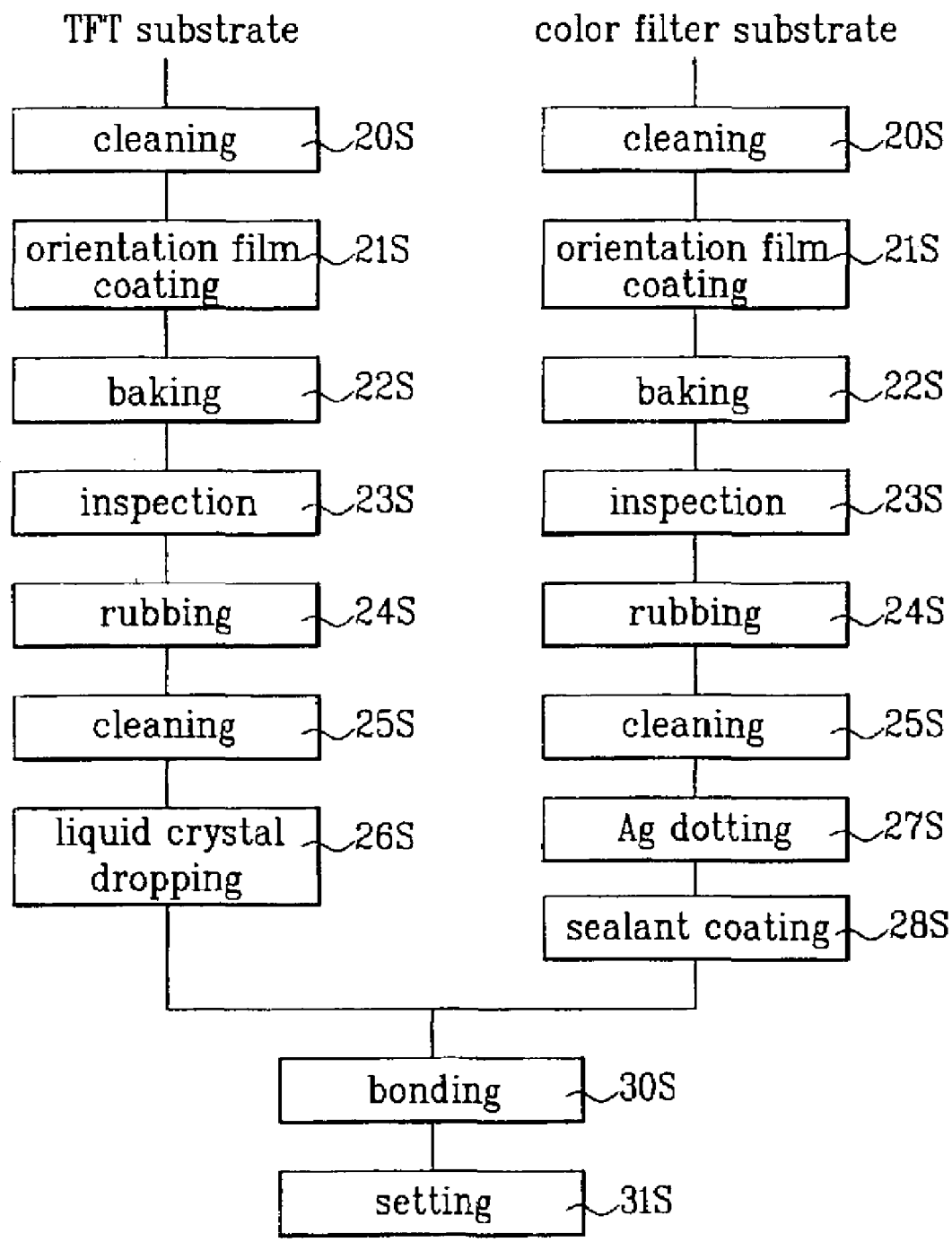
FIG. 6 illustrates a flow chart for explaining a method for fabricating an LCD having a dropping injection method applied thereto in accordance with an embodiment of the present invention.
Figure 7:
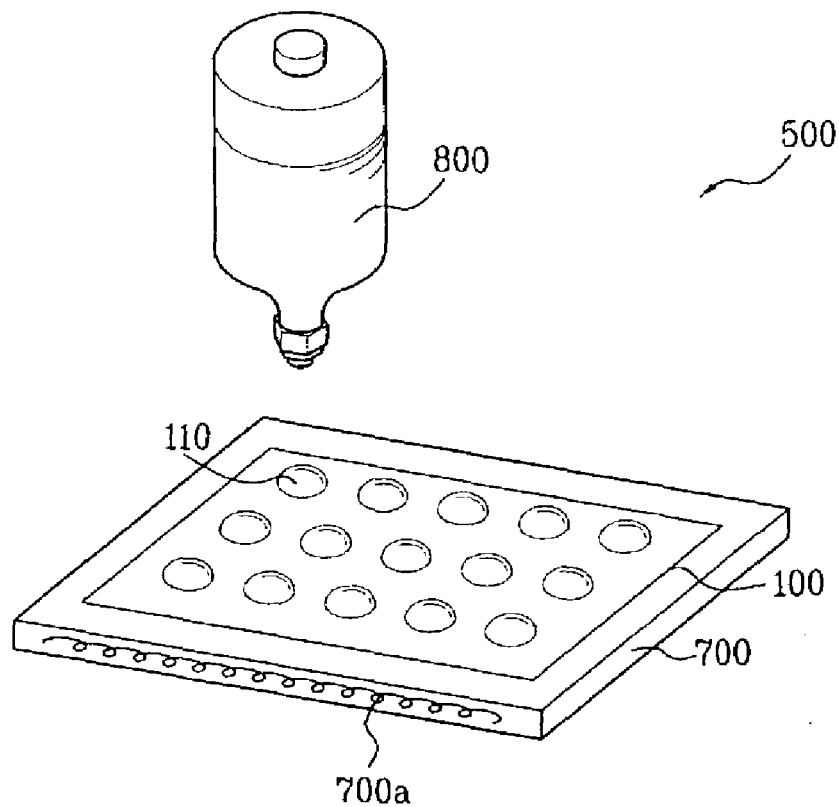
FIG. 7 illustrates a perspective view for explaining a liquid crystal dropping method in accordance with an embodiment of the present invention.
Figure 8:
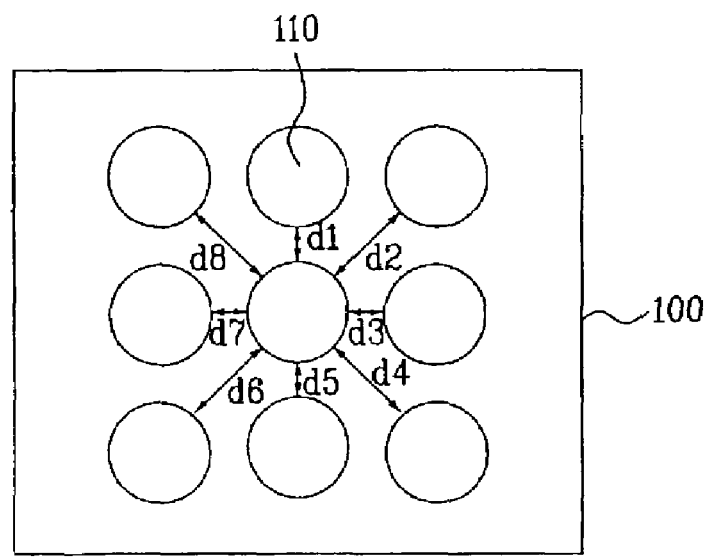
FIG. 8 illustrates a state after the liquid crystal dropping.

FIG. 6 illustrates a flow chart for explaining a method for fabricating an LCD having a dropping injection method applied thereto in accordance with an embodiment of the present invention. FIG. 7 illustrates a perspective view for explaining a liquid crystal dropping method in accordance with an embodiment of the present invention. FIG. 8 illustrates a state after the liquid crystal dropping.

Though not shown, first and second substrates having an array process and a color filter process applied thereto are provided. The first and second substrates respectively include a plurality of thin film transistor (TFT) unit substrate regions and color filter unit substrate regions, and when application of the array process and the color filter process is finished, the first substrate and the second substrate are loaded on a first cassette and a second cassette, respectively. The first cassette and the second cassette are loaded on a loader for a liquid crystal cell fabrication line by a transfer machine. The TFT unit substrate regions includes a plurality of gatelines running in one direction at fixed intervals, a plurality of datalines running in one direction perpendicular to the gatelines at fixed intervals, and a plurality of thin film transistors and pixel electrodes formed at a matrix of pixel regions defined by the gatelines and the datalines.

The color filter unit substrate regions includes a black matrix layer for shielding light of parts excluding the pixel regions, the color filter layer of three colors, and the common electrode for driving liquid crystal, together with the pixel electrodes, and the like.

A process for fabricating a liquid crystal cell under the above condition will be explained.

Referring to FIG. 6, the first substrate loaded on the first cassette and the second substrate matched to the first substrate loaded on the second cassette are selected and loaded on an orientation processing line by using a robot arm which understands information of the first and second cassettes (not shown) mounted in the loader.

The orientation process is carried out in an order of cleaning (20S) before coating an orientation film for removal of foreign matter and particles from the first and second substrates, coating the orientation film (21S), baking the orientation film (22S), inspection (23S), and rubbing (24S), which will be briefly explained.

Orientation liquid for coating the orientation film (21S) is dropped between a doctor roll and an anilox roll rotating in a dispenser. The orientation liquid is attached to, and maintained on an anilox roll surface as a liquid thin film, and transferred to a printing roll having a rubber plate attached thereto. Then, when the first and second substrates fixed to a coating stage advance, the thin film of the orientation liquid is transferred to, and coated on the first and second substrates.

Next, for vaporizing solvent in the orientation film printed on the first and second substrates, the baking process (22S) is carried out, and inspection of the orientation film (23S), and rubbing (24S) are carried out, to finish the orientation process.

When the orientation process is finished, a gap process is carried out, as follows.

After cleaning the first and second substrates (25S) having the orientation process applied thereto, the first substrate is loaded on a liquid dispenser, and the second substrate is loaded on a silver (Ag) dispenser and a seal dispenser in succession.

By this, Ag dots are coated for electrical connection to the common electrode on the second substrate (27S), and sealant having no liquid crystal injection hole is coated on a periphery of each unit panel region (28S). The sealant is photo, or thermo setting resin.

On the other hand, liquid crystal is dropped on a TFT unit substrate region on the first substrate opposite to an inner region of the sealant in the color unit substrate on the second substrate (26S), which will be explained.

Referring to FIG. 7, as a substrate 100 is loaded on a stage 700 of a liquid crystal dispenser 500, and a liquid crystal syringe 800 is arranged over the stage 700, liquid crystal 110 is dropped onto the substrate 100 through the syringe 800.

The stage 700 has a variable temperature controlling means 700a therein for controlling spreading of the liquid crystal. The variable temperature controlling means 700a is preferably formed of heating wire heated by electrical connection, for controlling a surface temperature of the stage 700.

The liquid crystal 110 is dropped on the substrate 100 in a form of drop. In this instance, the variable temperature controlling means 700a is controlled such that the surface temperature of the stage 700 is controlled within a range of approximately 30° C.-120° C. for making sure a distance between adjacent liquid crystal drops are minimal, which will be explained in more detail.

Referring to FIGS. 7 and 8, the liquid crystal is dropped on the substrate 100 on the stage 700 in forms of drops at fixed distances. The variable temperature controlling means 700a in the stage 700 is controlled to vary a temperature so that distances to adjacent liquid crystal drops 110 have relations of $d2=d4=d6=d8>d1=d3=d5=d7$, and the distances are minimized. The $d1=d3=d5=d7$ may be zero, which has an effect of suppressing occurrence of blots at boundaries of the liquid crystal drops in the related art.

That is, when the liquid crystal with a high viscosity is dropped on the substrate 100 on the stage 700 from the syringe 800, the liquid crystal drop spreads in a circular form by the surface temperature.

Though not shown, the syringe has a needle inserted therein, with one end in contact with a contact part of a needle sheet, wherein discharge of the liquid crystal is blocked as a spring on the needle allows the needle to be in contact with the needle sheet.

Next, there is solenoid means on top of the needle. If power is applied to a solenoid coil to generate a magnetic power, that moves the needle upward. Nitrogen gas $N_2$ is supplied from external gas supply, and applies a pressure to the liquid crystal, to drop the liquid crystal.

Next, when the application of power to the coil is stopped, the needle returns to an original position by an elastic force of the spring. Such up and down movement of the needle causes discharge of the liquid crystal.

Then, referring to FIG. 6, when bonding of the first and second substrates are progressed (30S), the dropped liquid crystal is spread in circular forms on the substrate. In this instance, since the gaps the liquid crystal is not present therein and are reduced adequately in the liquid crystal dropping process, the time period required for evacuation of the environment, and bonding the substrates can be reduced, substantially.

The bonding process is progressed as follows.

Though not shown, the first substrate is mounted on a table movable in a horizontal direction in a vacuum chamber, an entire bottom surface of the second substrate is vacuum adsorbed by a first adsorber. Then, the entire bottom surface of the second substrate is vacuum adsorbed by a second adsorber, the vacuum chamber is closed and evacuated. The second adsorber is moved downward in a vertical direction, until the first substrate and the second substrate has a predetermined gap, and the table having the first substrate mounted thereon is moved in a horizontal direction, until the first substrate and the second substrate are aligned.

Then, the second adsorber is moved downward in a vertical direction, to bond the second substrate and the first substrate with the sealant, and a pressure is applied to the first and second substrates so that the dropped liquid crystal is filled to a required thickness, thereby forming a large sized panel.

The large sized panel is taken out of the vacuum chamber, and an ultraviolet (UV) ray is directed to the sealant, to set the sealant (31S), thereby finishing the gap process. In this instance, a liquid crystal spreading process may be carried out additionally before unloading the bonded substrates for spreading the liquid crystal in the bonded substrates toward the sealant. The liquid crystal spreading process is carried out for more than about 10 minutes, under atmospheric pressure or vacuum.

Next, the TFT substrate and the color filter substrate are bonded together as the gap process is finished is loaded on a line for progressing an inspection process.

The inspection process includes a scribe process for forming cutting lines on a surface of the glass with a diamond pen which has a hardness higher than glass, and a break process for applying a force to, and breaking the glass, for cutting the vacuum bonded substrates into many sheets of cell units of liquid crystal unit panels, and grinding surfaces of the liquid crystal unit panel, and inspecting respective panels, thereby finishing the liquid crystal cell fabrication process.

The inspection includes a visual inspection for inspecting an orientation state of the liquid crystal, and Auto/Probe (A/P) inspection, for inspection of defective blots and electrical turn on/off. The defective blots can be automatically detected by naked eyes or by a solid state image device, such as a charge coupled device (CCD).

Upon finishing the liquid crystal cell fabrication process through the foregoing series of processes, though not shown, a module process for fitting a driver IC or mounting a back light and the like is carried out.

Though distances between liquid crystal drops on a substrate are minimized by controlling a surface temperature of a stage having a variable temperature controlling means provided thereto in the foregoing embodiment, characteristics of the orientation film formed on the substrate in the orientation process may be controlled, for minimizing the distances between the liquid crystal drops.

Figure 9:
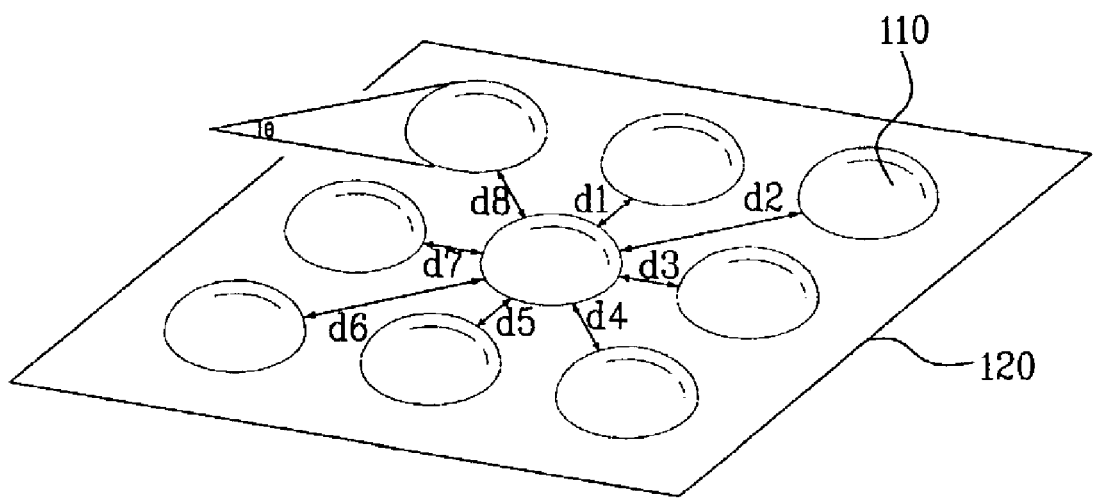
FIG. 9 illustrates after the liquid crystal dropping in accordance with another embodiment of the present invention.

That is, referring to FIG. 9, as the orientation film 120 coated in the orientation step in FIG. 6, an orientation film having a good wettability with a high surface energy, and good hydrophilic is used, for good spreading of the liquid crystal drop 110 on a surface of the orientation film 120, with a consequential smaller contact angle θ between the liquid crystal 110 and the orientation film 120.

The contact angle θ is an angle formed when a liquid is at a thermodynamic equilibrium on a solid surface. In this instance, the contact angle θ is small because the liquid crystal drop 110 tends to contact with the surface of the orientation film 120 owing to the high wettability and the good hydrophilic of the orientation film the liquid crystal drop 110 is in contact thereto.

Therefore, by minimizing a surface energy between the liquid crystal drop 110 and the orientation film 120, distances between adjacent liquid crystal drops 110 are minimized, gaps where no liquid crystal is present therein can be adequately made small. That is, the orientation film can provide an effect of suppressing an occurrence of blots at boundaries of the liquid crystal drops in the related art by forming an orientation film with a high wettability that provides relations of distances between adjacent liquid crystal drops 110 of d2=d4=d6=d8>d1=d3=d5=d7, and minimizing the distances. The d1=d3=d5=d7 may be zero.

As has been explained, the device for controlling spreading of liquid crystal, and method for fabricating an LCD of the present invention have the following advantages.

First, by employing a stage having a heating wire for varying a surface temperature, or by forming an orientation film with good wettability and hydrophilic on a substrate, distances between adjacent liquid crystal drops can be minimized, leading to gaps where no liquid crystal is present therein is made adequately small.

Second, the reduction of a time period required for pressing and bonding the two substrates by evacuating environment for eliminating gaps prevents peeling off of the sealant during a waiting time for bonding the two substrates by a pressure difference between the inside and outside of the two substrates, and leakage of the liquid crystal.

Third, the stage with the heating wire, or the orientation film with good wettability and hydrophilic accelerates spreading of viscous liquid crystal dropped on the substrate, and shortens a process time period.

Fourth, the suppression of occurrence of blots at boundaries of the liquid crystal drops improves a picture quality.

It will be apparent to those skilled in the art that various modifications and variations can be made in the device for controlling spreading of liquid crystal, and method for fabricating an LCD of the present invention without departing from the spirit or scope of the invention. Thus, it is intended that the present invention cover the modifications and variations of this invention provided they come within the scope of the appended claims and their equivalents.

What is claimed is:

1. A method for fabricating an LCD, comprising:
   (a) providing a first substrate;
   (b) forming an orientation film of a wettability on the first substrate;
   (c) dropping liquid crystal at fixed distances on the orientation film;

(d) spreading liquid crystal drops by themselves according to the wettability of the orientation film substantially without any external force until a first distance between liquid crystal drops adjacent to each other in a first direction and adjacent to each other in a second direction perpendicular to the first direction is zero, and a second distance between liquid crystal drops adjacent to each other in a third direction different from the first and second directions on the orientation film is greater than the first distance, prior to bonding the first substrate and a second substrate;

(e) after the drops of the liquid crystal being spread, bonding the first and second substrates; and (f) further spreading the liquid crystal in the bonding substrates by external force between the two substrates.

2. A method as claimed in claim 1, wherein the orientation film has a surface energy so that distances between adjacent liquid crystal drops are zero according to the surface energy of the orientation film.

3. A method as claimed in claim 1, further comprising cleaning the first substrate before forming an orientation film.

4. A method as claimed in claim 1, further comprising baking the orientation film before dropping liquid crystal.

5. A method as claimed in claim 4, further comprising inspecting the orientation film.

6. A method as claimed in claim 5, further comprising rubbing the orientation film.

7. A method as claimed in claim 1, wherein the first substrate is loaded on a liquid dispenser and then the second substrate is loaded on a silver (Ag) dispenser and a seal dispenser in succession.

8. A method as claimed in claim 7, further comprising coating a sealant on one of the two substrates.

9. A method as claimed in claim 8, wherein the sealant is one of photo and thermosetting resin.

10. A method as claimed in claim 1, further comprising controlling the temperature to control spreading of the liquid crystal.

11. A method as claimed in claim 10, wherein the temperature is controlled within a range of about 30° C.-120° C.

12. A method as in claim 11, wherein controlling the temperature minimizes the distances between adjacent liquid crystal drops.

13. A method for fabricating an LCD, comprising:
providing a first substrate on a stage;
forming an orientation film of a wettability on the first substrate;
dropping liquid crystal at fixed pitches on the orientation film;
controlling a surface temperature of the stage so that the dropped liquid crystal drops spreads by itself according to the wettability of the orientation film without any external force until a first distance between edges of liquid crystal drops adjacent to each other in a first direction and adjacent to each other in a second direction perpendicular to the first direction is zero, and a second distance between edges of liquid crystal drops adjacent to each other in a third direction different from the first and second directions is greater than the first distance, prior to bonding the first substrate and a second substrate;
after the dropped liquid crystal being spread, bonding the first substrate and the second substrate; and
further spreading the liquid crystal by applying an external force between the two substrates.

14. A method as claimed in claim 13, wherein the orientation film is hydrophilic with respect to the dropped liquid crystal for minimizing distances between adjacent liquid crystal drops.

15. A method as claimed in claim 13, further comprising:
loading the first substrate on a liquid dispenser; and
successively loading the second substrate on a silver (Ag) dispenser and a seal dispenser.

16. A method as claimed in claim 13, wherein controlling the surface temperature includes electrically heating a wire.

* * * * *